United States Patent
Kline (10) Patent No.: US 8,677,410 B2
(45) Date of Patent: Mar. 18, 2014

(54) DYNAMIC MEDIA CONFIGURATION

(75) Inventor: Eric V. Kline, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 315 days.

(21) Appl. No.: 13/110,434

(22) Filed: May 18, 2011

(65) Prior Publication Data

US 2012/0297438 A1 Nov. 22, 2012

(51) Int. Cl.
*G06F 3/00* (2006.01)

(52) U.S. Cl.
USPC ............ 725/45; 725/44; 725/46; 725/47; 725/59

(58) Field of Classification Search
None
See application file for complete search history.

(56) References Cited

U.S. PATENT DOCUMENTS

| | | | |
|---|---|---|---|
| 6,226,793 B1 | 5/2001 | Kwoh | |
| 6,408,128 B1* | 6/2002 | Abecassis | 386/239 |
| 7,114,174 B1* | 9/2006 | Brooks et al. | 725/105 |
| 7,380,258 B2 | 5/2008 | Durden et al. | |
| 2002/0059588 A1 | 5/2002 | Huber et al. | |
| 2002/0100046 A1* | 7/2002 | Dudkiewicz | 725/46 |
| 2004/0250272 A1* | 12/2004 | Durden et al. | 725/25 |
| 2005/0166234 A1* | 7/2005 | Jarman | 725/46 |
| 2005/0257242 A1* | 11/2005 | Montgomery et al. | 725/116 |
| 2006/0174277 A1* | 8/2006 | Sezan et al. | 725/46 |
| 2010/0131993 A1 | 5/2010 | Sanitate et al. | |

OTHER PUBLICATIONS

Bryson, "Options for Getting Filtered/Edited Movies and Television," About.com, kidstvmovies.about.com, copyright 2012, 1 page, accessed Nov. 16, 2012 http://kidstvmovies.about.com/od/parentalcontroltools/a/filters.htm.

"Clearplay," Clearplay Inc., Kidstvmovies.about.com, copyright 2012, 1 page, accessed Nov. 16, 2012 http://kidstvmovies.about.com/gi/o.htm?zi=1/XJ&zTi=1&sdn=kidstvmovies&cdn=parenting&tm=152&f=10&su=p284.9.336.ip_p504.3.336.ip_tt=2&bt=1&bts=0&zu=http%3A//www.clearplay.com/.

International Business Machines Corporation. "Variable Rating-Based Playback of Audio/Video Content". IPCOM000015940D. May 19, 2002. IP.com.

* cited by examiner

*Primary Examiner* — Cai Chen
(74) *Attorney, Agent, or Firm* — Yee & Associates, P.C.; David A. Mims, Jr.

(57) ABSTRACT

A method, data processing system, and computer program product for delivering media content. Outputs in a media player for use in delivering versions of a media content are identified. A parameter for each of the outputs is identified to form a set of parameters. A content distribution module forms a version of the media content from the media content and the set of parameters for each of the outputs to form a set of media content. Each of the set of media content is sent through an associated output in the outputs at substantially a same time.

15 Claims, 6 Drawing Sheets

DYNAMIC MEDIA CONFIGURATION

BACKGROUND

1. Field

The present disclosure relates generally to delivering media content and, in particular, to a method and apparatus for delivering different versions of the media content. Still more particularly, the present disclosure relates to a method and apparatus for delivering different versions of the media content at substantially the same time through different outputs of a media player.

2. Description of the Related Art

Today's movies, music, internet content, audio books, and various other media contain a wide range of content. Some content may be considered acceptable for media consumers while other content may be considered unacceptable for those media consumers. For example, a movie may contain language that parents consider inappropriate for a younger audience. Moreover, parents might determine that the movie contains content that they consider unacceptable for their own viewing.

Due to the wide range of content found in media, ratings are often used in order to indicate the type of content found in a particular media item. For example, a movie may be rated "R" if it contains certain types of actions or language that are only considered appropriate for adults. Another movie may be rated "PG" if it contains types of actions or language that are considered appropriate for a younger audience. Yet another movie may be rated "G" if it contains types of actions or language that are considered appropriate for an even younger audience.

A wide range of consumers may be interested in a certain media item. For example, when a new movie is released at theaters or on DVD, people of all ages may have a desire to watch the movie. In some cases, the movie may contain content that is considered inappropriate or unacceptable for younger audiences. In such cases, parents may decide to watch the movie on their own.

However, some parents may have a desire to watch the movie as a family, expect for certain portions of the movie that contain unacceptable content. In such a situation, the parents may skip over the portions of the movie with unacceptable content. In some cases, different versions of the movie are available for purchase. For example, a rated "R" version and a rated "PG" version may be available for a particular movie. Instead of buying the rated "R" version and skipping over unacceptable movie scenes, the parents may decide to purchase the "PG" version. In this case, although the parents may not see certain scenes found only in the rated "R" version, the family may enjoy watching the entire movie together.

SUMMARY

The different illustrative examples provide a method, data processing system, and computer program product for delivering media content. Outputs in a media player for use in delivering versions of a media content are identified. A parameter for each of the outputs is identified to form a set of parameters. A content distribution module forms a version of the media content from the media content and the set of parameters for each of the outputs to form a set of media content. Each of the set of media content is sent through an associated output in the outputs at substantially a same time.

DETAILED DESCRIPTION

As will be appreciated by one skilled in the art, aspects of the illustrative embodiments may be embodied as a system, method or computer program product. Accordingly, aspects of the illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of methods, apparatus (systems) and computer program products according to illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which are processed on the computer or other programmable apparatus provide processes for implementing the functions/acts specified in the flowchart and/or block diagram block or blocks.

The different illustrative embodiments recognize and take into account that currently, the ability for a media player to deliver multiple versions of a media content to a mixed audience is not available. The different illustrative embodiments recognize and take into account that forming multiple versions of a particular media content for delivery at substantially the same time may be desirable.

Figure 1:
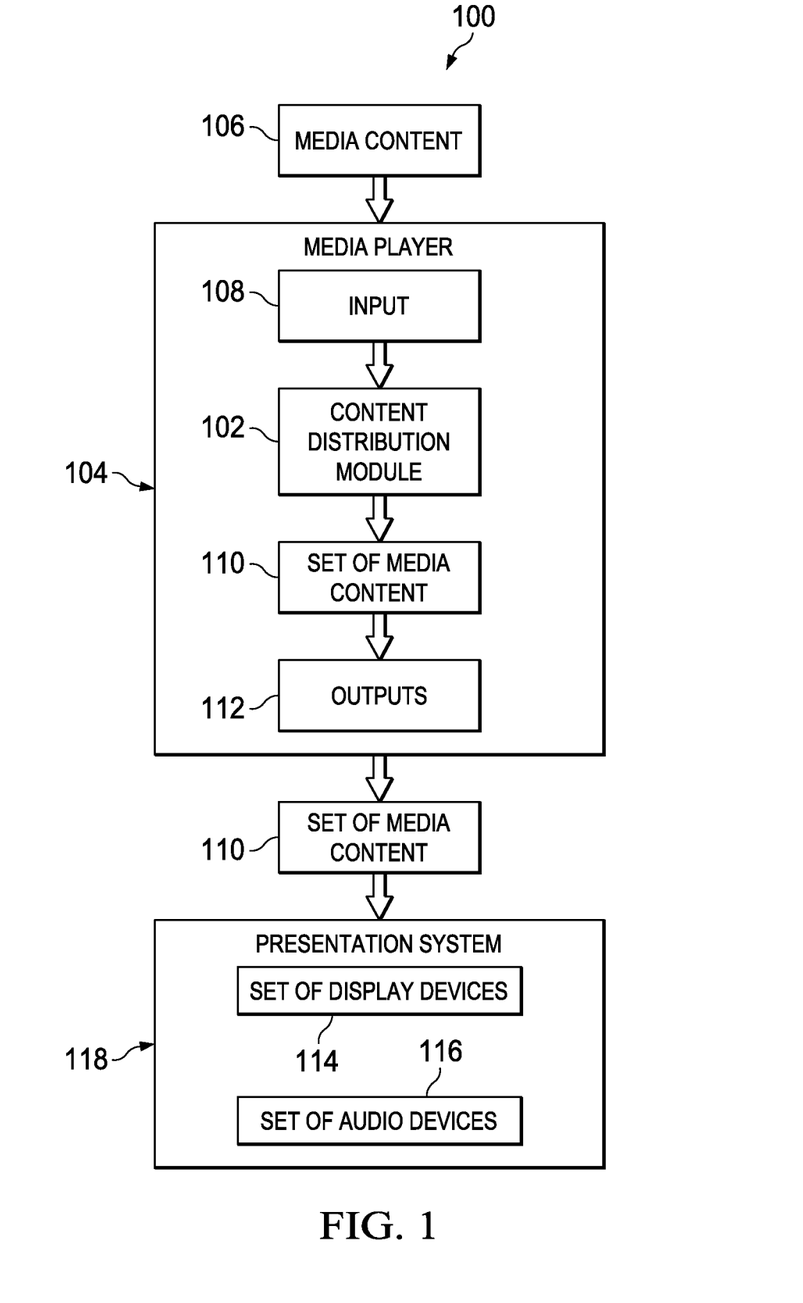
FIG. 1 is an illustration of a media delivery environment in accordance with an illustrative embodiment.

With reference now to the figures and, in particular, with reference to FIG. 1, an illustration of a media delivery environment 100 is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

In some illustrative examples, media delivery environment 100 may be implemented using a computer system or as part of a larger computer system. In some illustrative examples, media delivery environment 100 may be implemented using hardware components. In some illustrative examples, portions of media delivery environment 100 may be implemented software components as well. For example, content distribution module 102 may be implemented entirely with hardware, or with a combination of hardware components and software components. Similarly, some or all of the other components may be implemented entirely with hardware, or with a combination of hardware components and software components. However, at least a portion of media player 104 is implemented with hardware.

In these illustrative examples, content distribution module 102 is a component of media player 104. In some illustrative examples, content distribution module 102 may be a part of a computer system or directly connected to a computer system. Likewise, media player 104 may be a part of a computer system or directly connected to a computer system. In some illustrative examples, media player 104 may be contain additional components or may be a component of a larger system.

In these illustrative examples, media player 104 receives media content 106 through an input 108. Content distribution module 102 forms a set of media content 110. A "set" is two or more of something. In this case, a set of media content 110 is two or more versions of media content 110. The content distribution module 102 sends the set of media content 110 to outputs 112 of the media player 104. The set of media content 110 is sent to set of display devices 114 or set of audio devices 116, or a combination of the two in presentation system 118, depending on the type of media content. In some illustrative examples, set of media content 110 is sent to set of display devices 114 and set of audio devices 116.

Thus, content distribution module 102 may process media content 106 to create two or more versions of media content 106 to form a set of media content 110. This may be useful when it is desirable to present two or more different versions of the media content 106 to two or more consumers. For example, one version of content may include movie scenes with adult content, while another version of content may not include the movie scenes with adult content or may replace those scenes with different scenes. In some illustrative examples, content distribution module 102 may be programmed or configured in order to control what types of versions of the media content 106 are created, how many of each type are created, and how the versions are sent to outputs 112.

Media content 106 or set of media content 110 may take a variety of forms. For example, media content 106 or set of media content 110 may be any type of audio or video content such as movies, music, internet content, or audio books. Media content 106 or set of media content 110 may be in the form of a digital signal, analog signal, electrical signal, electromagnetic signal, or any other medium capable of delivering audio content or video content. Input 108 may be any type of hardware or hardware/software combination capable of receiving and transmitting media content 106. Outputs 112 may be any type of hardware or hardware/software combination capable of receiving and transmitting set of media content 110. In some illustrative examples, outputs 112 may be output devices capable of displaying video and/or playing audio content.

In these illustrative examples, each device in set of display devices 114 or each device in set of audio devices 116 may be used by a different person or shared between two or more people. The devices could be "dumb players." A "dumb player" is a device that receives and presents content without altering the content. A "dumb player" could also be controlled by another device or be programmed by another device. Furthermore, one or more devices may be in different locations.

For example, devices may be in different locations such that users of each device cannot hear or see audio or video output of another device. For example, devices may be located in different rooms, residences, houses, and buildings. Moreover, devices may take the form of displays, speakers, earplugs, headsets, head gear, glasses, hats, implants, portable screens, portable devices, or any other apparatus capable of delivering audio or video content to a person while preventing a person in the same room or vicinity from hearing or seeing the audio or video content.

The illustration of media delivery environment 100 in FIG. 1 is not meant to imply physical or architectural limitations to the manner in which different illustrative embodiments may be implemented. Other policies or combinations of policies may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, media player 104 may include additional components that interact with input 108, content distribution module 102, and outputs 112 in order to process media content 106, store media content 106, store versions of media content 106, or store data associated with media content 106 or data associated with processing or configuring versions of media content 106. Furthermore, components in media player 104 may be located in one hardware device or located in other devices or remote locations. For example, input 108 or outputs 112 may be in another location. Furthermore, input 108 may deliver media content 106 to content distribution module 102 through a physical connection, wireless connection, or combination physical and wireless connections. Similarly, content distribution module 102 may deliver media content 106 to outputs 112 through a physical connection, wireless connection, or combination physical and wireless connections.

Media content 106 may be physically inserted into media player 104 (DVD, flash drive, tape, etc.) or may be delivered to media player 104 through a physical connection or wirelessly. Similarly, one or more of set of media content 110 may be delivered to presentation system 118 through a physical connection or wirelessly.

Figure 2:
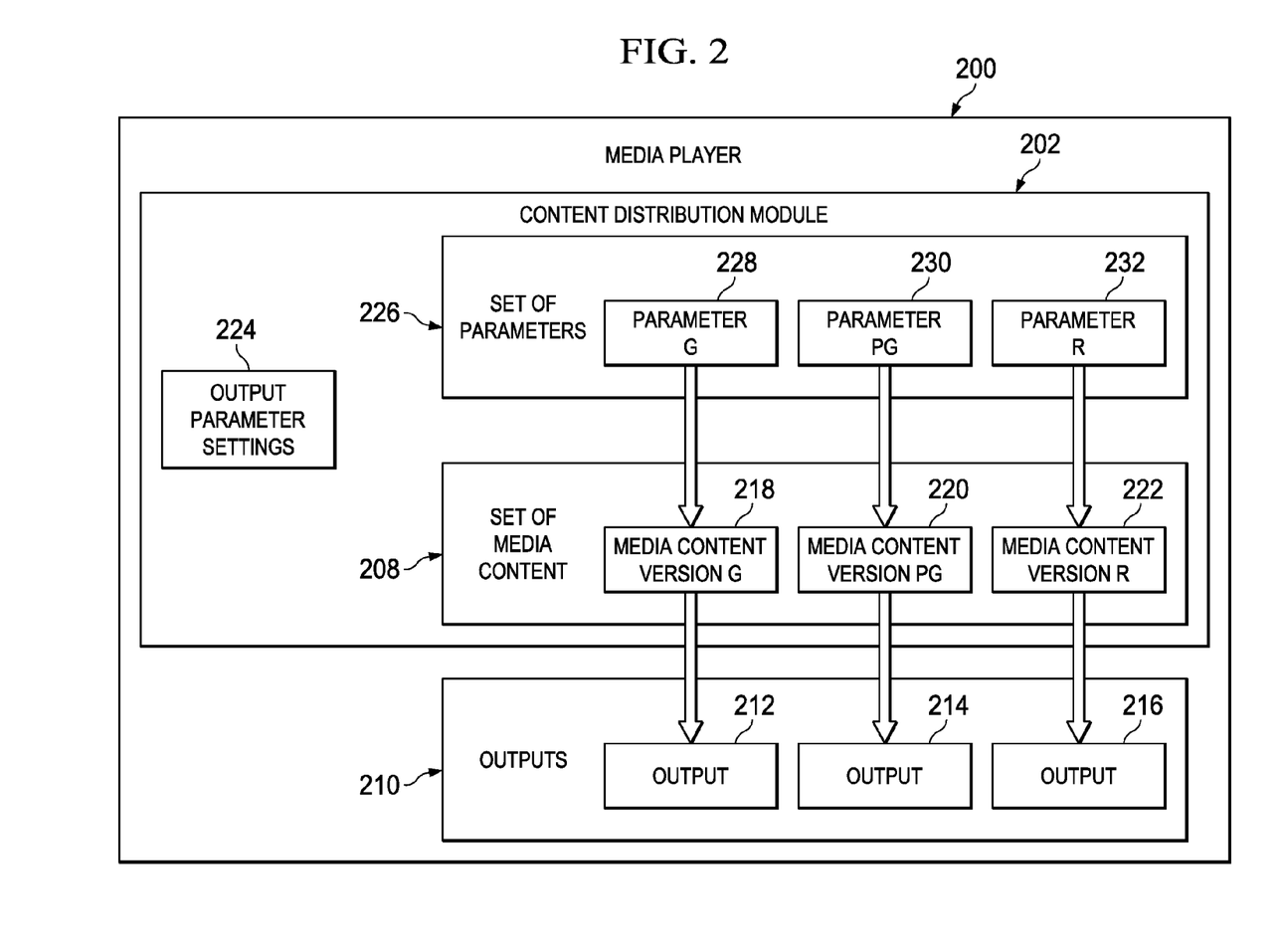
FIG. 2 is an illustration of a media player in accordance with an illustrative embodiment.

Turning now to FIG. 2, an illustration of a media player 200 is depicted in accordance with an illustrative embodiment. Media player 200 is a more detailed example of components in content distribution module 102 and outputs 112. In this illustrative example, media player 200 includes content distribution module 202, which receives media content 106 from input 108 and provides set of media content 208 to outputs 210. Furthermore, in this illustrative example, outputs 210 include output 212, output 214, and output 216. Furthermore, in this illustrative example, set of media content includes media content version G 218, media content version PG 220, and media content version R 222. Furthermore, in this illustrative example, media player 200 includes output parameter settings 224 and set of parameters 226, which includes parameter G 228, parameter PG 230, and parameter R 232.

In this illustrative example, content distribution module 202 associates parameter G 228 with output 212, parameter PG 230 with output 214, and parameter R 232 with output 216. Furthermore, in this illustrative example, content distribution module 202 uses media content 106 and parameter G 228 to form media content version G 218 for sending through output 212. Content distribution module 202 uses media content 106 and parameter PG 230 to form media content version PG 220 for sending through output 214. Additionally, content distribution module 202 uses media content 106 and parameter R 232 to form media content version R 222 for sending through output 216. In some illustrative examples, one or more parameters in set of parameters 226 are based upon a qualitative or quantitative rating system, such as a rating system for movies.

Furthermore, in this illustrative example, media player 200 sends each of the set of media content 208 through an associated output in the outputs 210 at substantially the same time. In other words, media content version G 218, media content version PG 220, and media content version R 232 are respectively sent through output 212, output 214, and output 216 at approximately the same time. Thus, for example, each of the set of media content 208 may be sent through outputs 210 beginning at approximately the same time. Furthermore, each of the set of media content 208 may stop being sent through outputs 210 at approximately the same time. Each of set of media content 208 may be audio-based or video-based.

In some illustrative examples, forming a version of a media content from the media content 106 and a parameter value includes adding, removing, replacing, or altering at least a portion of the media content 106 based upon the media content 106 and the parameter value. For example, parameter R 232 may cause content distribution module 202 to add, remove, replace, or alter at least a portion of audio or video content, parameter PG 230 may cause content distribution module 202 to add, remove, alter at least a portion of audio or video content in a different way, and parameter G 228 may cause content distribution module 202 to add, remove, replace, alter at least a portion of audio or video content in a different way, such that each version of media content differs in content from the other. In some illustrative examples, no portion of media content 106 is added, removed, replaced, or altered in forming a version of a media content from the media content 106 and a parameter. Furthermore, in some illustrative examples, one or more of the versions may not differ in content from one or more of the other versions.

Each of set of parameters 226 may specify a threshold associated with content. A threshold is a parameter value that indicates how much, if at all, media content is to be altered, based upon the type of content found in the media content. For example, parameter R 232 may cause content distribution module 202 to not alter media content 106 to form media content version R 222. Parameter PG 230 may cause content distribution module 202 to alter media content 106 to form media content version PG 220. Parameter G 228 may cause content distribution module 202 to alter media content 106 to a greater degree to form media content version G 218. Altering media content 106 to a greater degree may include adding, removing, replacing, or altering additional content.

In some illustrative examples, altering at least a portion of audio or video content may include replacing a portion of the audio or video content with alternate content. For example, a scene from a movie may be removed and replaced with an alternate scene or other content from a different source. The alternate scene or other content may be selected from the media content 106 or from another source, such as another source in the media player or a source outside of the media player. Furthermore, the alternate scene or other content may be selected from alternate scene versions for a particular scene or from other alternate content versions for a particular portion of content.

Furthermore, output parameter settings 224 may be saved for one or more of the outputs 210. In some illustrative examples, output parameter settings 224 may be saved based upon the media content 106 and one or more of the outputs 210. For example, parameter setting may be saved, recalled, and applied for output 212, wherein the parameter setting is applied to output 212 for a particular media content 106, such as a particular audio or video content, one or more of additional media content 106, certain categories or genres of media content 106, or all types of media content 106.

Furthermore, one or more parameter settings associated with one or more of outputs 210 may be associated with each other to form a group of parameter settings (or "profile"), that can be saved in output parameter settings 224. Thus, the profile can be used to apply parameter settings to multiple outputs at a time, as in the above example for the single output. For example, one profile may be created and saved for movies that a family watches together, while another profile may be created and saved for movies that parents and friends watch together.

The particular audio or video content may be a song, movie, or any other type of audio or video content. In some illustrative examples, output parameter settings 224 may be over-ridable by a password. In other illustrative examples, output parameter settings 224 may not be over-ridable by a password. Furthermore, output parameter settings 224 may be associated with specific media content, such as a particular movie or song.

In some illustrative examples, media content 106 may be associated with one or more codes. The codes may be embedded or digitally embedded within the media content 106. A code is any type of data that can be embedded or associated with the media content 106, such as a letter (i.e., "R"), number, symbol, or a combination of series of letters, numbers, and symbols (i.e., "PG", "PG-13"). Media content 106 may include codes that indicate a type of content for one or more portions of media content 106. The type of content may indicate a type of language or actions in audio or video content. For example, a code may indicate a rating for the media content 106 or one or more portions of media content. Thus, a code provides an indication as to the type or content or a description of the type of content associated with the code.

In one illustrative example, a code may be associated with each scene of a movie to indicate the rating for each scene. A scene may be a series of images, collection of frames, or a portion of audio or video content that begins at one point in time and ends at a later point in time. In some illustrative examples, content distribution module 202 forms one or more versions of media content based upon the media content 106, one or more of set of parameters 226, and one or more codes associated with the media content 106.

For example, if a code of "R" is associated with a scene in media content 106, then content distribution module 202 may remove, replace, or alter the scene when forming media content version G 218 based upon parameter G 228. Similarly, content distribution module 202 may remove, replace, or alter the scene in the same way or a different way than for media content version G 218 when forming media content version PG 220 based upon parameter PG 230. In this illustrative example, content distribution module 202 may not alter the scene when forming media content version R 222 based upon parameter R 230 because the code associated with media content 106 matches parameter R 230. This match means that content is not removed, altered, or replaced.

Figure 3:
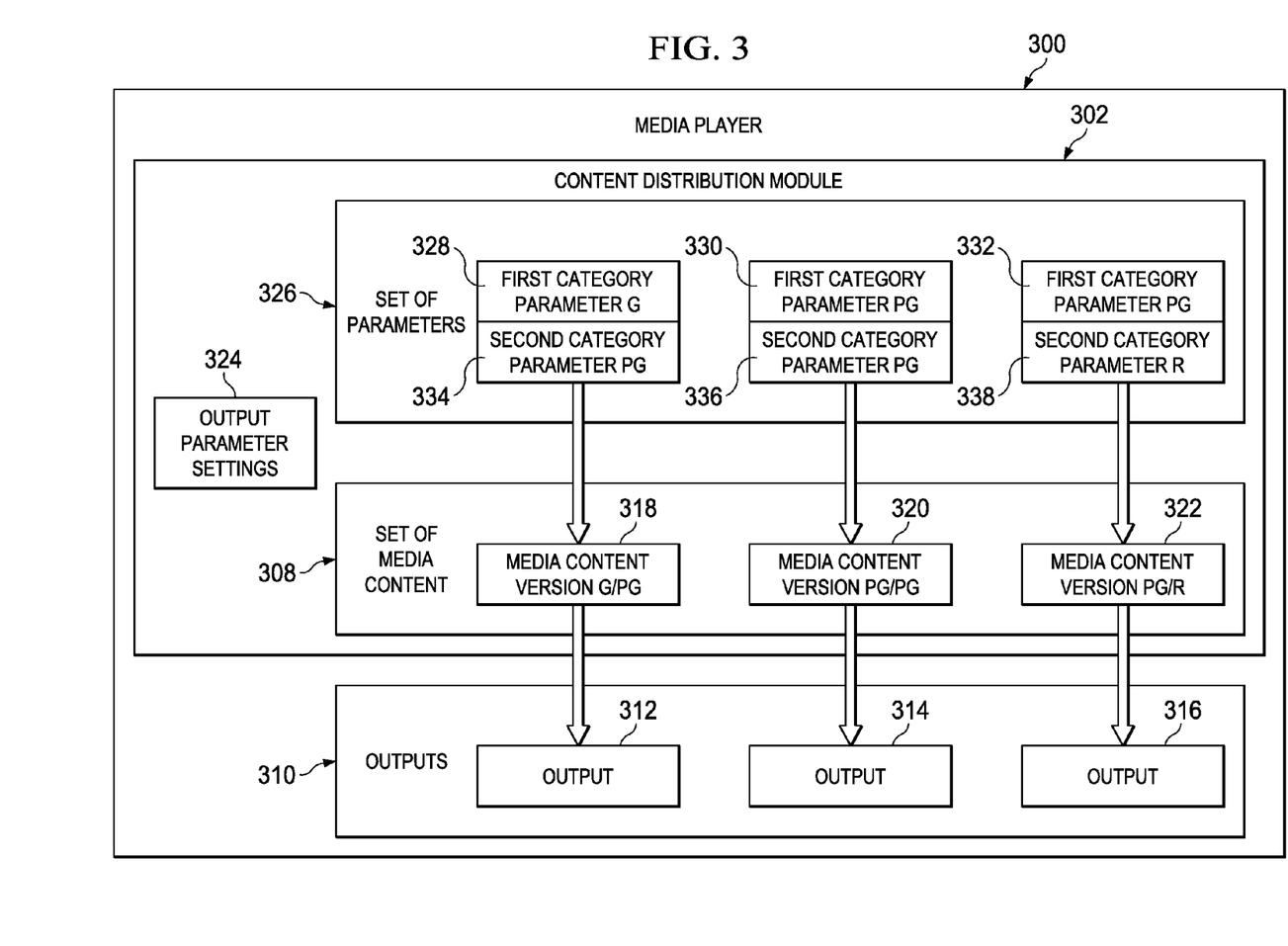
FIG. 3 is an illustration of a media player in accordance with an illustrative embodiment.

With reference now to FIG. 3, an illustration of a media player 300 is depicted in accordance with an illustrative embodiment. Media player 300 is a more detailed example of components in content distribution module 102 and outputs 112.

In this illustrative example, media player 300 includes content distribution module 302, which receives media content 106 from input 108 and provides set of media content 308 to outputs 310. Furthermore, in this illustrative example, outputs 310 include output 312, output 314, and output 316. Furthermore, in this illustrative example, set of media content includes media content version G/PG 318, media content version PG/PG 320, and media content version PG/R 322. Furthermore, in this illustrative example, media player 300 includes output parameter settings 324 and set of parameters 326, which includes first category parameter G 328, first category parameter PG 330, first category parameter PG 332, second category parameter PG 334, second category parameter PG 336, and second category parameter R 338.

In this illustrative example, content distribution module 302 associates first category parameter G 328 and second category parameter PG 334 with output 312, first category parameter PG 330 and second category parameter PG 336 with output 314, and first category parameter PG 332 and second category parameter R 338 with output 316. Furthermore, in this illustrative example, content distribution module 302 uses media content 106 and first category parameter G 328 and second category parameter PG 334 to form media content version G/PG 318 for sending through output 312. Content distribution module 302 uses media content 106 and first category parameter PG 330 and second category parameter PG 336 to form media content version PG/PG 320 for sending through output 314. Content distribution module 302 uses media content 106 and first category parameter PG 332 and second category parameter R 338 to form media content version PG/R 322 for sending through output 316.

Furthermore, in this illustrative example, media player 300 sends each of the set of media content 308 through an associated output in the outputs 310 at substantially the same time. In other words, media content version G/PG 318, media content version PG/PG 320, and media content version PG/R 322 are respectively sent through output 312, output 314, and output 316 at approximately the same time. Thus, for example, each of the set of media content 308 may be sent through outputs 310 beginning at approximately the same time. Furthermore, each of the set of media content 308 may stop being sent through outputs 310 at approximately the same time. In this illustrative example, each of set of media content 308 may be audio-based or video-based. Video-based media content, as used herein, is defined as media content having both audio content and video content that can be displayed visually (i.e., a movie, music video, or other visual display). Audio-based media content, as used herein, is defined as media content having audio content (i.e., music or other sounds). In some illustrative examples, each of set of media content 308 may have content for visual display only.

In some illustrative examples, forming a version of a media content from the media content 106 and a parameter includes adding, removing, replacing, altering, or not altering at least a portion of the media content 106 based upon the media content 106 and the parameter value. Furthermore, two or more parameters may be used to form each version of media content. In this illustrative example, forming a version of a media content is based upon a first parameter associated with a first category of content (i.e., language) and a second parameter associated with a second category of content (i.e., actions).

For example, second category parameter R 338 may cause content distribution module 302 to add, remove, replace, or alter at least a portion of audio or video content of a second category to form media content version PG/R 332 and second category parameter PG 336 may cause content distribution module 302 to add, remove, or alter at least a portion of audio or video content of the second category in a different way to form media content version PG/PG 320, such that the content of the second category differs between the two versions. In some illustrative examples, no portion of media content 106 is added, removed, replaced, or altered in forming a version of a media content from the media content 106 and a parameter.

Furthermore, in some illustrative examples, one or more of the versions may not differ in content of a certain category from one or more of the other versions. For example, since second category parameter PG 334 may have the same value as second category parameter PG 336, the content of the second category may be the same in both media content version G/PG 318 and media content version PG/PG 320. Moreover, if first category parameter G 328 has a different value than first category parameter PG 330, the content of the first category may differ between media content version G/PG 318 and media content version PG/PG 320. Thus, content from one category may be may be altered independent of content from one or more other categories to form a particular version of media content through the use of two or more parameters, where each parameter is associated with a different category of content or specifies a threshold for a different category of content.

Each of the set of parameters 326 may specify a threshold associated with a category of content. For example, second category parameter R 338 may cause content distribution module 302 not to alter content of a second category to form media content version PG/R 322. Second category parameter PG 336 may cause content distribution module 302 to alter content of the second category to form media content version PG/PG 220. Furthermore, if second category parameter PG 336 was changed to a different value to specify a different threshold, then content distribution module 202 may alter content of the second category to a greater degree to form a media content version. Altering media content 106 to a greater degree may include adding, removing, replacing, or altering additional content. Similarly, first category parameter G 328, first category parameter PG 330, and first category parameter PG 332 may specify thresholds associated with a second category of content.

In some illustrative examples, altering at least a portion of audio or video content may include replacing a portion of the audio or video content with alternate content. For example, a scene from a movie may be removed and replaced with an alternate scene or content from a different source. The alternate scene or content may be selected from the media content 106 or from another source, such as another source in the media player or a source outside of the media player. Furthermore, the alternate scene or content may be selected from alternate scene versions for a particular scene or from alternate content versions for a particular portion of content.

Furthermore, output parameter settings 324 may be saved for one or more of the outputs 310. In some illustrative examples, output parameter settings 324 may be saved based upon the media content 106 and one or more of the outputs 310. For example, an output setting may be saved for output 312, wherein the output setting is applied to output 312 for a particular media content 106, such as a particular audio or video content. The particular audio or video content may be a song, movie, or any other type of audio or video content.

In some illustrative examples, media content 106 may be associated with one or more codes. For example, media content 106 may include codes that indicate a type of content for one or more portions of media content 106. The type of content may indicate a type of language or actions in audio or video content. For example, a code may indicate a rating for the media content 106 or one or more portions of media content. In some illustrative examples, a code may be associated with each scene of a movie to indicate the rating for each scene. A scene may be a series of images, collection of frames, or a portion of audio or video content that begins at one point in time and ends at a later point in time. In some illustrative examples, content distribution module 302 forms one or more versions of media content based upon the media content 106, one or more of set of parameters 326, and one or more codes associated with the media content 106. For example, if a code of "R" is associated with a second category of content for a scene in media content 106, then content distribution module 302 may remove, replace, or alter the scene when forming media content version G/PG 318 based upon second category parameter PG 334. Similarly, content distribution module 302 may remove, replace, or alter the scene in the same way or a different way than for media content version G/PG 318 when forming media content version PG/PG 320 based upon second category parameter PG 336. In this illustrative example, content distribution module 302 may not alter the scene when forming media content version PG/R 322 based upon second category parameter R 338 because the code associated with media content 106 matches second category parameter R 338, indicating that content is not removed or altered or replaced.

Furthermore, in some illustrative examples, each threshold for each category may be set independent of each other. In some illustrative examples, a threshold for one category may be related to or affect a threshold for another category to form a particular version of media content. In some illustrative examples, a difference between a first category threshold and a second category threshold for a particular version of media content or for a particular output may not exceed a specified value. The difference may be measured in steps, levels, a number, or another quantitative method. For example, if threshold "R" does not modify content, threshold "PG" removes some content determined unacceptable for those under 18, and threshold "G" removes even more content determined unacceptable for those under 12, then the difference may be measured in steps or levels, such that a move from G to PG is one step and a move from G to R is two steps.

Thus, in this illustrative example, a maximum allowed difference of one step may be specified for any particular version of media content. In such a case, a version of media content with an "R" threshold for a first category of content and a "PG" threshold for a second category of content may be permitted, but a version of media content with an "R" threshold for a first category of content and a "G" threshold for a second category of content may not be permitted.

Figure 4:
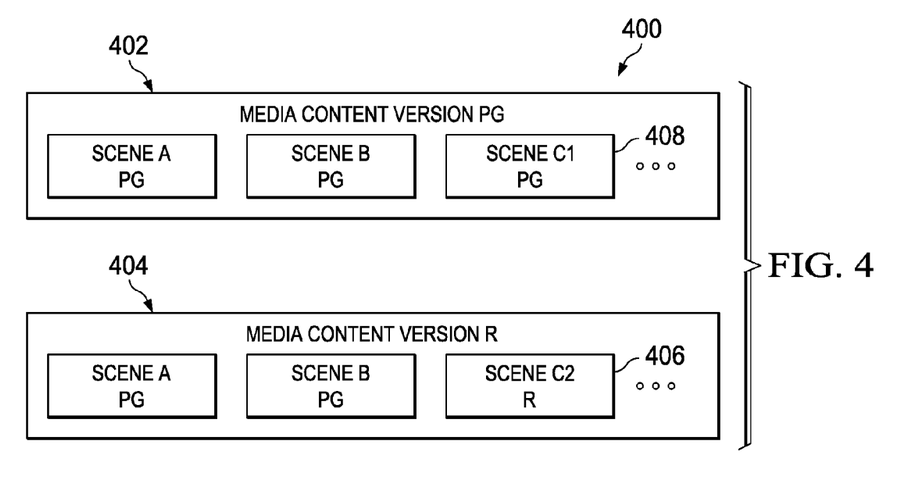
FIG. 4 is an illustration of a set of media content in accordance with an illustrative embodiment.

With reference now to FIG. 4, an illustration of set of media content is depicted in accordance with an illustrative embodiment. Set of media content 400 is an example of versions of media content in set of media content 208 sent through outputs 210 of FIG. 2.

Media content version PG 402 is an example of media content version PG 220 and media content version R 404 is an example of media content version R 222.

In this illustrative example, scene C2 406 is present in media content version R. However, scene C2 406 is replaced with scene C1 408 to form media content version PG. Furthermore, additional scenes may be added, removed, replaced, or altered to form each of set of media content 400. Thus, two different versions of media content may be sent through outputs 210 at substantially the same time.

Figure 5:
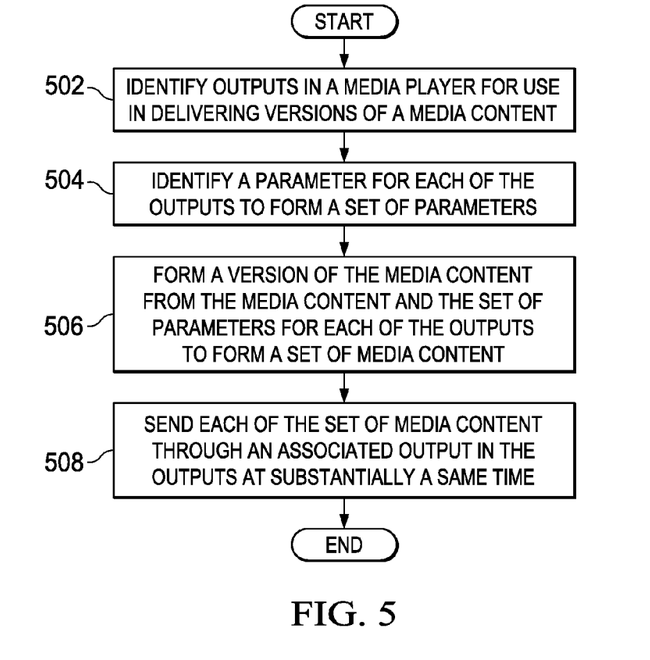
FIG. 5 is an illustration of a flowchart of a process for delivering media content in accordance with an illustrative embodiment.

With reference now to FIG. 5, an illustration of a flowchart of a process for delivering media content is depicted in accordance with an illustrative example. The process illustrated in FIG. 5 may be implemented in a media delivery environment, such as media delivery environment 100 in FIG. 1. In particular, this process may be implemented by media player 104 in FIG. 1.

The process begins by identifying outputs in a media player 104 for use in delivering versions of a media content 106 (step 502). The process then identifies a parameter for each of the outputs to form a set of parameters 226 (step 504). The process then forms a version of the media content from the media content 106 and the set of parameters 226 for each of the outputs to form a set of media content 208 (step 506). The process then sends each of the set of media content 208 through an associated output in the outputs 210 at substantially a same time (step 508). The process then terminates.

Figure 6:
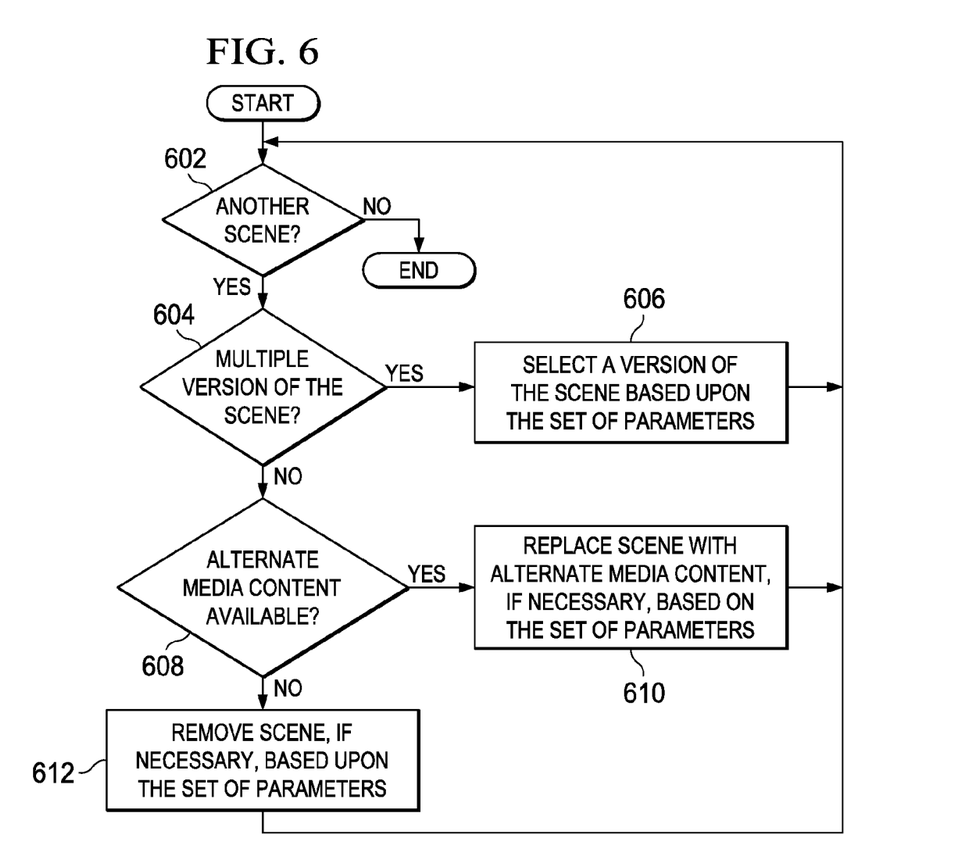
FIG. 6 is an illustration of a flowchart of a process for delivering media content in accordance with an illustrative embodiment.

With reference now to FIG. 6, an illustration of a flowchart of a process for delivering media content is depicted in accordance with an illustrative example. The process illustrated in FIG. 6 may be implemented in a media delivery environment, such as media delivery environment 100 in FIG. 1. In particular, this process may be implemented by media player 104 in FIG. 1.

The process begins by determining whether there is another scene in a media content 106 (step 602). If there is another scene, the process determines if there are multiple versions of the scene (step 604). The multiple versions of the scene may be contained in the media content 106 or another source from inside or outside the media player 104. If there are multiple versions of the scene, the process selects a version of the scene based upon the set of parameters 226 (step 606). The process then returns to step 602.

With reference again to step 604, if there are not multiple versions of the scene, the process determines if alternate media content is available (step 608). If alternate media content is available, the process replaces the scene with the alternate media content, if necessary, based on the set of parameters 226 (step 610). The process then returns to step 602.

With reference again to step 608, if alternate media content is not available, the process removes the scene, if necessary, based upon the set of parameters 226 (step 612). The process then returns to step 602. At step 602, if there is not another scene in the media content, the process terminates.

Figure 7:
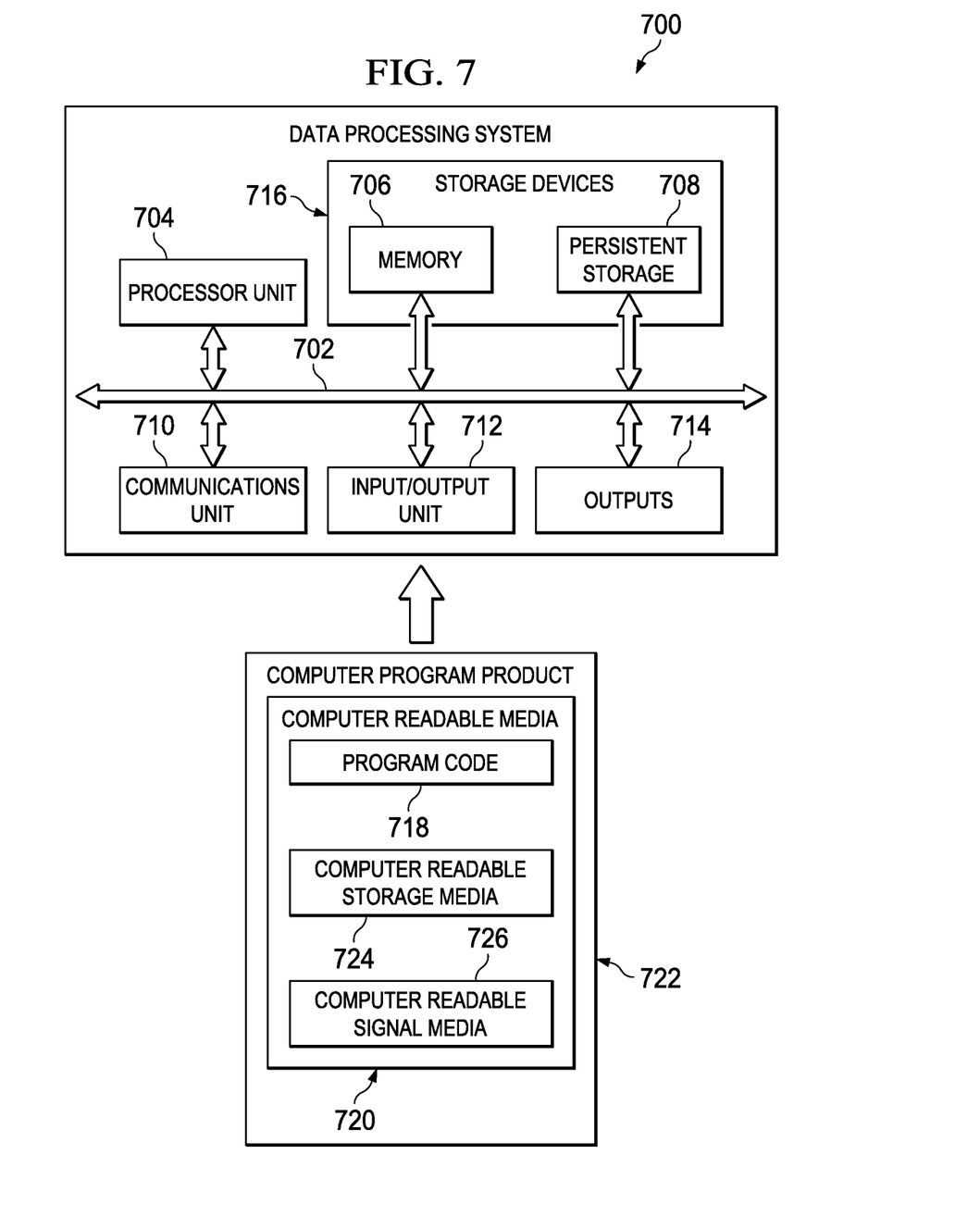
FIG. 7 is an illustration of a data processing system in accordance with an illustrative embodiment.

Turning now to FIG. 7, an illustration of a data processing system is depicted in accordance with an illustrative embodiment. Illustrative examples may be implemented using data processing system 700 or a portion of data processing system 700. Aspects of the illustrative embodiments may be implemented using the hardware components or a combination of the hardware and software components described below. For example, data processing system 700 may implement media player 104 or portions of media player 104. In some illustrative examples, content distribution module 102 may be implemented by any one or a combination of processor unit 704, communications unit 710, and storage devices 708. In some illustrative examples, content distribution module 102 may be implemented entirely in software or a combination of software and hardware components.

In this illustrative example, data processing system 700 includes communications fabric 702, which provides communications between processor unit 704, memory 706, persistent storage 708, communications unit 710, input/output (I/O) unit 712, and outputs 714.

Processor unit 704 serves to run instructions for software that may be loaded into memory 706. Processor unit 704 may be a number of processors, a multi-processor core, or some other type of processor, depending on the particular implementation. A number, as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Outputs 714 provides a mechanism to deliver media content. Moreover, input/output unit 712 may receive a media content 106.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 or run by processor unit 704. The processes of the different illustrative examples may be performed by processor unit 704 using computer implemented instructions, which may be located in a memory, such as memory 706.

These instructions are referred to as program code, computer usable program code, or computer readable program code that may be read and run by a processor in processor unit 704. The program code in the different illustrative examples may be embodied on different physical or computer readable storage media, such as memory 706 or persistent storage 708.

Program code 718 is located in a functional form on computer readable media 720 that is selectively removable and may be loaded onto or transferred to data processing system 700 and run by processor unit 704. Program code 718 and computer readable media 720 form computer program product 722 in these examples. In one example, computer readable media 720 may be computer readable storage media 724 or computer readable signal media 726. Computer readable storage media 724 may include storage devices, such as, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage device, such as a hard drive, a thumb drive, or a flash memory, that is connected to data processing system 700. In some instances, computer readable storage media 724 may not be removable from data processing system 700. In these illustrative examples, computer readable storage media 724 is a non-transitory computer readable storage medium.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative examples, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different examples may be implemented. The different illustrative examples may be implemented in a data processing system including components in addition to or in place of those illustrated for data processing system 700. Other components shown in FIG. 2 can be varied from the illustrative examples shown. The different illustrative examples may be implemented using any hardware device or system capable of running program code.

A storage device in data processing system 700 is any hardware apparatus that may store data. Memory 706, persistent storage 708, and computer readable media 720 are examples of storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706, or a cache, such as found in an interface and memory controller hub that may be present in communications fabric 702.

Thus, the different illustrative examples provide a method, data processing system, and computer program product for delivering media content. Outputs in a media player for use in delivering a media content are identified. A parameter for each of the outputs is identified to form a set of parameters. A content distribution module forms a version of the media content from the media content and the set of parameters for each of the outputs to form a set of media content. Each of the set of media content is sent through an associated output in the outputs at substantially a same time.

One or more of illustrative embodiments provide features that are not present in current media players or methods for delivering media. For example, current media players deliver the one version of a media content at a time. Therefore, current media players do not allow multiple versions of the media content to be formed and delivered at substantially the same time.

For example, parents may decide to watch an "R" rated version of a movie on a different display device than a son of the parents. The son may watch a "PG" rated version of the movie at substantially the same time. The parents may watch the movie on different display devices that the son. Therefore, the family can enjoy watching two or more versions of the same movie at the same time.

The flowchart and block diagrams in the Figures illustrate the architecture, functionality, and operation of possible implementations of systems, methods and computer program products according to various illustrative embodiments. In this regard, each block in the flowchart or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular illustrative examples only and is not intended to be limiting of the illustrative embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the illustrative embodiments has been presented for purposes of illustration and description, but is not intended to be exhaustive or limited to the illustrative embodiments in the form disclosed. Many modifications and variations will be apparent to those of ordinary skill in the art without departing from the scope and spirit of the illustrative embodiments. The embodiment was chosen and described in order to best explain the principles of the illustrative embodiments and the practical application, and to enable others of ordinary skill in the art to understand the various embodiments with various modifications as are suited to the particular use contemplated.

What is claimed is:

1. A method for delivering media content, the method comprising:

identifying, by a media player, a plurality of output devices located in the media player that delivers different versions of the media content to a plurality of presentation systems coupled to the plurality of output devices;

identifying, by the media player, a parameter associated with each of the plurality of output devices located in the media player;

forming, by the media player, a different version of the media content for each of the plurality of output devices located in the media player based on the parameter associated with each of the plurality of output devices to form a plurality of different versions of the media content;

and sending, by the media player, each of the plurality of different versions of the media content through an associated output device in the plurality of output devices located in the media player at a same time to deliver the plurality of different versions of the media content to the plurality of presentation systems at the same time;

and wherein the parameter associated with each of the plurality of output devices located in the media player comprises a first parameter and a second parameter, wherein the first parameter specifies a threshold for a first category of media content, and wherein the second parameter specifies a threshold for a second category of media content;

and wherein the first category of media content is associated with one of language and actions and the second category of media content is associated with a different one of language and actions.

2. The method of claim 1, wherein the plurality of different versions of the media content is selected from audio-based media content.

3. The method of claim 1, wherein the plurality of different versions of the media content is selected from video-based media content.

4. The method of claim 3, wherein the forming, by the media player, the different version of the media content for each of the plurality of output devices located in the media player comprises:

removing, by the media player, a scene from the video-based media content for at least one output device in the plurality of output devices located in the media player.

5. The method of claim 4, further comprising:

replacing, by the media player, the scene with alternate media content.

6. The method of claim 3, wherein the forming, by the media player, the different version of the media content for each of the plurality of output devices located in the media player comprises:

selecting, by the media player, a scene version from a plurality of scene versions for a particular scene.

7. The method of claim 1, further comprising:

saving, by the media player, output parameter settings for at least one output device based upon the media content and the parameter associated with the at least one output device.

8. The method of claim 1, wherein the forming, by the media player, the different version of the media content for each of the plurality of output devices located in the media player comprises:

forming, by the media player, the different version of the media content for at least one of the output devices based upon a code associated with the media content.

9. A media player for delivering media content, the media player comprising:

a bus;

a communications unit connected to the bus;

a storage device connected to the bus, wherein the storage device includes stores program code;

and a processor unit connected to the bus, wherein the processor unit executes the program code to:

identify a plurality of output devices located in the media player that delivers different versions of the media content to a plurality of presentation systems coupled to the plurality of output devices:

identify a parameter associated with each of the plurality of output devices located in the media player;

form, a different version of the media content and the set of parameters for each of the plurality of output devices located in the media player based on the parameter associated with each of the plurality of output devices to form a plurality of different versions of the media content;

and send each of the plurality of different versions of the media content through an associated output device in the plurality of output devices located in the media player at a same time to deliver the plurality of different versions of the media content to the plurality of presentation systems at the same time;

and wherein the parameter associated with each of the plurality of output devices located in the media player comprises a first parameter and a second parameter, wherein the first parameter specifies a threshold for a first category of media content, and wherein the second parameter specifies a threshold for a second category of media content;

and wherein the first category of media content is associated with one of language and actions and the second category of media content is associated with a different one of language and actions.

10. The media player of claim 9, wherein the plurality of different versions of the media content is selected from video-based media content.

11. The media player of claim 10, wherein executing the program code to form the different version of the media content for each of the plurality of output devices located in the media player comprises executing the program code to select a scene version from a plurality of scene versions for a particular scene.

12. The media player of claim 9, wherein executing the program code to form the different version of the media content for each of the plurality of output devices located in the media player based on the parameter associated with each of the plurality of output devices to form the plurality of different versions of the media content comprises executing the program code to form the different version of the media content for at least one of the output devices based upon a code associated with the media content.

13. A computer program product for delivering media content, the computer program product comprising:

a computer readable storage device;

program code, stored on the computer readable storage device, for identifying a plurality of output devices located in a media player that delivers different versions of the media content to a plurality of presentation systems coupled to the plurality of output devices;

program code, stored on the computer readable storage device, for identifying a parameter associated with each of the plurality of output devices located in the media;

program code, stored on the computer readable storage device, for forming, a different version of the media content for each of the plurality of output devices located in the media player based on the parameter associated with each of the plurality of output devices to form a plurality of different versions of the media content; and program code, stored on the computer readable storage device, for sending each of the plurality of different versions of the media content through an associated output device in the plurality of output devices located in the media player at a same time to deliver the plurality of different versions of the media content to the plurality of presentation systems at the same time;

and wherein the parameter associated with each of the plurality of output devices located in the media player comprises a first parameter and a second parameter, wherein the first parameter specifies a threshold for a first category of media content, and wherein the second parameter specifies a threshold for a second category of media content;

and wherein the first category of media content is associated with one of language and actions and the second category of media content is associated with a different one of language and actions.

14. The computer program product of claim 13, wherein the program code, stored on the computer readable storage device, for forming the different version of the media content for each of the plurality of output devices located in the media player comprises:

program code, stored on the computer readable storage device, for selecting a scene version from a plurality of scene versions for a particular scene.

15. The computer program product of claim 13, wherein the program code, stored on the computer readable storage device, for forming the different version of the media content for each of the plurality of output devices located in the media player comprises program code, stored on the computer readable storage device, for forming the different version of the media content for at least one of the output devices based upon a code associated with the media content.

* * * * *